United States Patent [19]

Werner et al.

[11] Patent Number: 4,596,835
[45] Date of Patent: Jun. 24, 1986

[54] REINFORCED CELLULAR OR NONCELLULAR POLYURETHANE MOLDED PARTS

[75] Inventors: Frank Werner, Neustadt; Rainer Blum, Ludwigshafen; Peter Horn, Heidelberg; Martin Welz, Bad Durkheim; Rolf Osterloh, Gruenstadt, all of Fed. Rep. of Germany

[73] Assignee: BASF Aktiengesellschaft, Ludwigshafen, Fed. Rep. of Germany

[21] Appl. No.: 673,974

[22] Filed: Nov. 23, 1984

[30] Foreign Application Priority Data

Nov. 29, 1983 [DE] Fed. Rep. of Germany ....... 3343125

[51] Int. Cl.$^4$ .................. C08G 18/77; C08G 18/14
[52] U.S. Cl. ................................ 521/122; 521/76;
521/99; 521/103; 521/120; 521/123; 521/137;
521/160; 521/162; 524/871; 524/872; 528/44;
528/45; 528/48; 528/52; 528/53; 528/54;
528/55; 528/57; 528/67
[58] Field of Search ................... 528/45; 521/76, 122;
524/871, 872

[56] References Cited

U.S. PATENT DOCUMENTS

| | | | |
|---|---|---|---|
| 4,005,035 | 1/1977 | Deaver | 521/122 |
| 4,251,401 | 2/1981 | Reischl | 260/9 |
| 4,288,563 | 9/1981 | Thorpe | 521/122 |
| 4,298,556 | 11/1981 | Rutsch et al. | 521/130 |
| 4,327,194 | 4/1982 | Chandalia et al. | 521/122 |
| 4,381,352 | 4/1983 | McBrayer | 521/122 |
| 4,400,497 | 8/1983 | Blum et al. | 528/45 |
| 4,459,399 | 7/1984 | Ihrman et al. | 528/64 |

FOREIGN PATENT DOCUMENTS

| | | |
|---|---|---|
| 1146036 | 3/1969 | United Kingdom . |
| 1306145 | 2/1973 | United Kingdom . |
| 1411948 | 10/1975 | United Kingdom . |
| 1451824 | 10/1976 | United Kingdom . |

*Primary Examiner*—Herbert S. Cockeram
*Attorney, Agent, or Firm*—D. Barbara McKenzie; Joseph D. Michaels

[57] ABSTRACT

Reinforced cellular or noncellular molded polyurethane parts are prepared by heating a mixture of reinforcing materials and a heat-curable composition of polyisocyanates and polyols in an open or closed mold, said composition being storage-stable at room temperature and containing, optionally, auxiliaries and additives. In said composition, the polyisocyanate is dispersed in the form of discreet particles having particle diameters from 0.1 to 150 $\mu$m in the polyol and the polyisocyanate particles are deactivated on their surfaces such that from 0.01 to 20 equivalent percent of the total available isocyanate groups are deactivated and such that the ratio of free isocyanate groups to hydroxyl groups is from 0.7:1 to 2.5:1.

The polyurethane molded parts are suitable for use as self-supporting trim parts, reinforcement parts, or molded parts for various applications.

9 Claims, No Drawings

REINFORCED CELLULAR OR NONCELLULAR POLYURETHANE MOLDED PARTS

BACKGROUND OF THE INVENTION

1. Field of the Invention

This invention pertains to polyurethane molded parts. More specifically it relates to reinforced polyurethane molded parts derived from room temperature-stable, heat-curable polyisocyanate-polyol mixtures.

2. Description of the Prior Art

The preparation of fiber-reinforced cellular polypolyurethane molded parts or semi-finished parts from fiber-reinforced thermoplastic polyurethanes is described in numerous patents and patent applications.

As described in GB No. 1,209,243, polyurethane foam molded parts are prepared by placing an amount of an expandable mixture of organic polyisocyanates, compounds having reactive hydrogen atoms, blowing agents, and catalysts larger than is required for complete foam expansion in a temperature-controlled, closeable mold and allowing said mixture to expand and cure therein under compression.

In order to improve the mechanical properties of such molded foam parts, fibers or fiber mats through which the foam can expand to completely fill the mold as well as reinforcing structures, for example structures of metal, plastic, or plywood, are placed in the mold and are imbedded in the molded polyurethane part that is produced by the subsequent addition polymerization reaction and foam expansion. This method has not been able to be used to produce relatively large molded parts, since sufficient penetration and wetting of the inlays can only be achieved with relatively short foam travel distances with the relatively high viscosity expandable polyurethane mixture, especially with systems having relatively short cream times. Moreover, from an equipment standpoint it is relatively complicated and expensive to fill the expandable polyurethane mixture into the mold simultaneously from several openings.

In order to eliminate this disadvantage, in U.S. Pat. No. 4,298,556 a neutral ester having a boiling point higher than that of the foaming reaction temperature of the urethane mixture in amounts ranging from 5 to 30 weight percent. The purpose of this is to improve flow characteristics. This addition of an ester can adversely affect the mechanical properties of the resulting molded parts. In addition, when this method is used, a maximum of 40 parts by weight very fine fibers can be imbedded in the foam.

In GB No. 1,146,036 a process is described for preparing mold parts in which semi-finished products of fiber-reinforced thermoplastics are heated until plastic flow is achieved and then the parts are formed. This permits stable, high-strength molded parts to be produced in a simple manner. Such parts can be used in automotive and furniture manufacturing. The semi-finished product used in this process consists of smooth roll stock, sheets, or boards which can be prepared by coating textile flat planar structures, for example, glass fiber mats, with a plastic melt using an extruder. However, when this simple process is used, the fiber mat cannot be completely saturated with the thermoplastic melt when the fiber mat is coated on both sides. Cavities or voids form in the completed semi-finished product, which greatly reduces the strength of the finished products.

Such phenomena also are not completely avoided when, as in GB No. 1,306,145, open glass fiber mats are laminated with a thermoplastic or are impregnated and then hot pressed. In addition, in a continuous embodiment of this process, there is the disadvantage that the hot semi-finished product must be cooled in a special operation after being pressed. This takes a relatively long time, so that the cycle times are greatly increased.

As disclosed in GB No. 1,451,824, one or more textile planar structures heated to from 150° to 300° C. and a melt of a thermoplastic material are brought together and then pressed together in a compression zone, and then cooled in order to continuously produce a semi-finished product from fiber-reinforced thermoplastic materials. The disadvantage when thermoplastic materials are incorporated in a molten state in a textile planar structure, for example glass fiber mats, is that their high viscosity causes insufficient wetting of the textile planar structure, which causes defects in the form of air inclusions.

A different principle for preparing semi-finished products from fiber-reinforced thermoplastics is described in DE application No. 20 54 471. Here, the fiber mats are coated with thermoplastic dispersions. Then the water is evaporated and the semi-finished material is heated until the plastic softens. This does produce a void-free semi-finished product, but the process is very expensive since complicated drying equipment must be used to completely remove the water.

Reversibly thermal formable fiber-reinforced rigid polyurethane plastics are obtained in GB No. 1,411,948 when inorganic and/or organic fibers are incorporated in a polyurethane reaction mixture which is liquid at temperatures to 50° C., said reaction mixture being prepared by the reaction of hydroxyl group-containing polyesters and/or polyethers having hydroxyl numbers from 100 to 600 with urethane, biuret, urea, allophanate, carbodiimide, uretonimine, and/or isocyanurate group-containing polyisocyanates or polyphenyl polymethylene polyisocyanates. The disadvantage in this case is that only modified polyisocyanates can be used, which not only has an effect on the mechanical properties but also makes the process more expensive.

A process for continuously making semi-finished products from fiber-reinforced thermoplastic polyurethanes in which the fiber-containing planar structure is easily and completely wetted with the reactable polyurethane mixture, is disclosed in German Patent Application No. P 32 42 089.7. In this process the polyisocoyanates, polyhydroxyl compounds, chain extenders, catalysts, as well as optionally auxiliaries and/or additives are mixed continuously, the flowable reaction mixture is applied to the fiber-containing planar structure and is allowed to react in a continuous-sheet process in a temperature controlled zone at temperatures from 60° to 220° C. until hardening occurs.

The preparation of polyurethane planar structures, coverings or coatings from storage-stable, heat-curable polyurethane compositions is also known. Such compounds consist, for example in DE application No. 15 70 548, of a polyhydroxyl compound, a uretidione diisocyanate which melts at over 100° C., and a chain extender which melts at over 80° C., whereby at least 80 percent of the total number of uretidione diisocyanate and chain extender particles must be under 30 μm.

Storage-stable, heat-curable substance mixtures suitable for use as coating agents and adhesives, as well as sealing compositions, in which the polyisocyanate is present in the form of discreet particles in the polyol and is deactivated at its surface, are also described in EP application No. 62 780. In comformity with the application area, this process only produces flexible, adhesive products.

The purpose of this claimed invention is to prepare reinforced cellular or noncellular polyurethane molded parts using a commercially feasible method in a cost-effective manner such that the disadvantages cited above would be largely eliminated. The polyurethane molded parts had to contain a high percentage of reinforcing material. However, it was also important that the reinforcing material was completely wetted with the reactable, optionally expandable, polyurethane mixture before beginning to form polyurethane.

This objective is met through the use of a heat-curable single-component polyurethane formulation which is storage-stable at room temperature to produce the polyurethane molded parts.

SUMMARY OF THE INVENTION

The subject of this invention is reinforced cellular or noncellular polyurethane molded parts prepared by heating a reinforcing material with a room temperature storage-stable, heat-curable composition of polyisocyanate and polyol including necessary auxiliaries and additives wherein the polyisocyanate is present as surface-inactivated particles dispersed in the polyol.

DESCRIPTION OF THE PREFERRED EMBODIMENTS

The low viscosity of the composition of polyisocyanate and polyols which is storage-stable at room temperature, said viscosity ranging from 100 to 10,000 m.Pas at 25° C., preferably from 500 to 5,000 m.Pas, depending on the amount and type of basic components, results in simple and complete wetting of the reinforcing materials. The cost of equipment to perform this process is low, since it is not necessary to use a complicated molding machine having metering units for the various basic components and having a mixing device. The stable mixtures can be poured by hand in a discontinuous manner from a container into the molding machine or they can be fed into the molds continuously using a metering pump. This means that the polyurethane molded parts can be produced in a cost-effective manner.

The following should be noted with regard to the basic components used to produce the mixture as well as the preparation of said components, and also the reinforcing materials and optionally, auxiliaries and additives:

The following may be used as the organic polyisocyanate: aliphatic, cycloaliphatic, arylaliphatic, and preferably, aromatic polyfunctional isocyanate. Typical examples are: alkylene diisocyanate having from 2 to 12, preferably 4 to 6, carbon atoms in the alkylene radical such as 1,2-ethane diisocyanate, 1,4-butane diisocyanate, 2-ethyl-1,4-butane diisocyanate, 2-methyl-1,5-pentane diisocyanate, 1,6-hexane diisocyanate, 2-ethyl-1,6-hexane diisocyanate, 1,8-octane diisocyanate, 1,10-decane diisocyanate, and 1,12-dodecane diisocyanate; cycloaliphatic diisocyanates such as 1,3-cyclohexane diisocyanate and 1,4-cyclohexane diisocyanate as well as various mixtures of these monomers, 1-isocyanato-3,3,5-trimethyl-5-isocyanatomethyl cyclohexane, 2,4- and 2,6-hexahydrotoluene diisocyanate as well as various mixtures of these isomers, 4,4'-, 2,2'-, and 2,4'-dicyclohexylmethane diisocyanate as well as various mixtures comprised of at least two of these isomers; arylaliphatic diisocyanates such as 1,2-, 1,3- and 1,4-xylene diisocyanate; and aromatic polyisocyanates such as 4,4'-, 2,4'- and 2,2'-diisocyanatodiphenylmethane, and the corresponding mixtures of at least two of these isomers, 2,4'- and 2,6'- diisocyanatotoluene and the corresponding isomer mixtures, 1,5-diisocyanatonaphthalene, polyphenylpolymethylene polyisocyanate and mixtures of the isomeric diisocyanatodiphenylmethanes and polyphenylpolymethylene polyisocyanate. The cited di- and polyisocyanates can be used individually or in the form of mixtures.

So-called modified polyfunctional isocyanates are also suitable, in other words products obtained through the chemical reaction of the above di- and/or polyisocyanate. Typical examples are di- and/or polyisocyanates containing esters, urea, biuret, allophanate, carbodiimide, and preferably urethane, uretidione, or isocyanaurate groups.

Particularly successful and therefore preferred for use are solid di- and/or polyisocyanates which are solid at room temperature, such as 4,4'-diisocyanatodiphenylmethane and 1,5-naphthalene diisocyanate and di-and/or polyisocyanates which are modified with urethane, uretidione, or isocyanurate groups, and are based on 1,6-hexane diisocyanate, 1-isocyanato-3,3,5-trimethyl-5-isocyanatomethylcyclohexane, 2,4'-, 4,4'-diisocyanatodiphenylmethane, and preferably, 2,4- and 2,6- toluene diisocyanate.

Modified polyisocyanates of the preferred typed are addition products of diisocyanatotoluene and trimethylolpropane, trimerized (isocyanurate group-containing) diisocyanatotoluene and diisocyanatodiphenylmethanes, and dimerized (uretidione group-containing) diisocyanatotoluenes, 4,4'- or 2,4'-diisocyanato- diphenylmethanes.

Preferably linear and/or branched polyester polyols and/or polyether polyols having molecular weights from 136 to 10,000, preferably from 3000 to 8000, and more preferably from 4000 to 6000 are used as the polyols for the preparation of the heat-curable mixtures which are storagestable at room temperature, respectively for the reinforced cellular or noncellular polyurethane molded parts produced there- from. However, other hydroxyl group-containing polymers having the cited molecular weights may be used, for example polyesteramides, polyacetals such as polyoxymethylene and butanediol formals, and polycarbonates, preferably aliphatic polycarbonates prepared from diphenylcarbonate and 1,6-hexanediol by means of transesterification.

Suitable polyester polyols have a functionality of from 2 to 3.5, preferably from 2 to 3 and can be prepared, for example, through known methods from organic dicarboxylic acids, preferably aliphatic dicarboxylic acids having from 2 to 12, preferably 4 to 6 carbon atoms in the alkylene radical, and polyfunctional alcohols, preferably diols. Typical organic dicarboxylic acids are: aliphatic dicarboxylic acids such as succinic, glutaric, pimelic acid, undecane dicarboxylic acid, dodecane dicarboxylic acid, and preferably, adipic acid and mixtures of succinic, glutaric, and adipic acid, and aromatic dicarboxylic acids such as phthalic acid and terephthalic acid. Example of di-and polyfunctional, in particular difunctional, alcohols are: 1,2- respectively, 1,3-propanediol, 1,4-butanediol, 1,5pentanediol, 1,6-hexanediol, 1,10-decanediol, dipropyleneglycol, glycerin, trimethylopropane, and preferably, 1,2-ethanediol, diethylene glycol, 1,4-butanediol, 1,6-hexanediol, and mixtures of 1,4-butanediol, 1,5 pentanediol, and 1,6-hexanediol. In addition, alkanolamines such as triethanolamine, triisopropanolamine, diethanolamine, etc. can be used as the polyfunctional alcohol. If polyfunctional, preferably trifunctional alcohols are also used to prepare the polyester polyols, their content must be selected such that the functionality of the resulting polyester polyols is a maximum of 3.5, preferably from 2 to 3.0.

Desirable results were obtained with such polyester polyols which were obtained through the condensation polymerization of a dicarboxylic acid mixture which, based on the total weight of the cited dicarboxylic acid, contains: from 20 to 35 weight percent succinic acid, from 35 to 50 weight percent glutaric acid, and from 20 to 32 weight percent adipic acid, and alcohol mixtures of 1,2 ethanediol/1,4-butanediol, 1,2-ethanediol/diethylene glycol, 1,2ethanediol/trimethylolpropane, diethylene glycol/trimethylolpropane, 1,2-ethanediol/triisopropanolamine, diethylene glycol/triisopropanolamine, or adipic acid and a mixture of 1,4-butanediol, 1,5-pentanediol, and 1,6-hexanediol. Such polyester polyols are therefore preferred.

The polyester polyols possess molecular weights between 1000 and 3000, preferably 1200 and 2500.

However, the use of polyether polyols is preferred for the polyols. Said polyether polyols are prepared using known methods, for example by means of the anionic polymerization with alkali hydroxides such as sodium or potassium hydroxide, or alkali alcoholates such as sodium methylate, sodium or potassium ethylate or potassium isopropylate as catalysts, or by means of the cationic polymerization using Lewis acids such as antimony pentachloride, boron fluoride etherate, etc. or bleaching earth as catalysts, from one or more alkylene oxides having from 2 to 4 carbon atoms in the alkylene radical, and an initiator, which contains from 2 to 8 preferably 2 to 4, reactive hydrogen atoms in bonded form.

Suitable alkylene oxides are, for example: tetrahydrofuran, 1,3-propylene oxide, 1,2- and 2,3-butylene oxide, styrene oxide, epichlorohydrin, and preferably ethylene oxide, and 1,2-propylene oxide. The alkylene oxide can be use individually, alternately one after another, or as mixtures. Typical initiators are: water, organic dicarboxylic acid such as succinic acid, adipic acid, phthalic acid, and terephthalic acid, aliphatic and aromatic, optionally N-mono-, N,N- and N,N'-dialkyl-substituted diamines having from 1 to 4 carbon atoms in the alkyl radical, such as optionally mono- and dialkyl-substituted ethylenediamine, diethylenetriamine, triethylenetetramine, 1,3-propylene diamine, 1,3- or 1,4-butylenediamine, 1,2-, 1,3-, 1,4-, 1,5- and 1,6-hexamethylenediamine, phenylenediamine, 2,4- and 2,6-toluenediamine, and 4,4'-, 2,4'- and 2,2'-diaminodiphenylmethane.

Additional initiators are alkanolamines such as ethanolamine, diethanolamine, N-methyl- and N-ethylethanolamine, N-methyl- and N-ethyldiethanolamine, and triethanolamine, ammonia, hydrazine, and hydrazides. Preferably polyfunctional, more preferably di- and/or trifunctional alcohols such as ethylene glycol, 1,2-propylene glycol, and 1,3-propylene glycol, diethylene glycol, dipropylene glycol, 1,4-butylene glycol, 1,6-hexamethylene glycol, glycerin, trimethylolpropane, pentaerythritol, sorbitol and succrose are used.

The polyether polyols have molecular weights ranging from 136 to 10,000 preferably from 3000 to 8000 and more preferably from 400 to 6000. As with the polyester polyols, they may be used individually or in the form of mixtures. In addition, they can be mixed with the polyester polyols as well as with the hydroxyl group-containing polyester amides, polyacetals, and polycarbonates.

The mixtures of polyisocyanates and polyols contain the polyisocyanates in the form of discreet particles having particle diameters of from 0.1 to 150 $\mu$m, in particular from 1 to 50 $\mu$m dispersed in the polyol.

In order to prevent an addition polymerization reaction from occurring between the polyisocyanates and polyols at room temperature, the dispersed polyisocyanate particles are deactivated on their surfaces. The deactivating agent is appropriately selected such that it is bonded to the surface of the polyisocyanate particles by either chemical or physical forces, thereby causing a phase separation between the polyisocyanate particles and the polyol.

In the chemical deactivation, from 0.01 to 20, preferably from 0.1 to 10 and more preferably from 0.3 to 5, equivalent percent of the total available isocyanate groups are reacted with the deactivating agent.

To do this, the deactivating agent can be added to the mixtures at the required equivalence ratios. Another suitable method is a process in which the deactivating agent is added in amounts in excess of the required equivalence ratio.

After the surface of the dispersed phase has been fully occupied by the deactivating agent, the deactivating reaction stops.

The following deactivating agents may be used: water, mono- and polyamines, mono- and polyalcohols. Particularly well suited are relatively long chained monoamines, for example stearylamine, which react to form a kind of grafted-on emulsifier. Higher molecular weight polyamines, for example polyamidamines, and hydroxyl-terminated polymers, for example hydroxyl-terminated polybutadiene oils, react to form grafted-on protective colloids. Particularly suitable for deactivating the isocyanate groups on the surface of the polyisocyanate particles, in other words, for stabilizing the isocyanate/polyol dispersion, are also reactions which produce urea or polyurea structures on the isocyanates, since such structures are insoluble in most polyols and organic solvents. Reagents forming such ureas or polyureas are water and primary or secondary amines, whereby short-chained diamines such a ethylene diamine or propylene diamine are preferred. The polyureas formed from these short-chained diamines are more organophobic than those formed from longer chained diamines and in many cases they therefore have a more stabilizing effect.

The following may also be used as deactivating agents: compounds containing carboxyl groups such as homo- and copolymers of acrylic acid, methacrylic acid, maleic acid, and other polymerizable acids, acid products of condensation polymerization reactions such as polyesters prepared with an excess of acid, acid polymers obtained through the alcoholysis of the adducts of maleic acid anhydride on unsaturated polymers, for example linseed oil or polybutadiene oil; compounds which contain phenolic hydroxyl compounds, such as phenol, cresol, cardanol, p-tert-butylphenol, 2,2-bis[4-hydroxyphenyl]propane, and the non-crosslinked condensation products of the phenol groups with aldehydes, for example formaldehyde, which are also termed resoles.

Amide-group containing compounds such as soluble polyamides and polymers of acrylamide and methacrylamide or copolymers of acrylamide and methacrylamide with acrylate acid esters and/or methacrylic acid esters; polyhydrazides, obtained through the hydrazinolysis of polyacrylates and their preparation, for example as described by M. Hartmann, R. Dowbenko, U. T. Hockswender in *Organic Coatings+Applied Polymer Science* vol. 46 (1982), pp. 429, 432.

Also suitable are compounds having alcoholic hydroxyl groups, provided that their solubility in water is less than 1 weight percent.

The cited deactivating agents generally have molecular weights from 18 to 1 million, preferably from 18 to 5000.

Preferably used as deactivating agents are: primary and secondary aliphatic amines, water or compounds containing carboxyl, phenolic hydroxyl, hydrazide, amide, or alcoholic hydroxyl groups, whereby the compounds with alcoholic hydroxyl groups must have a solubility in water of less than 1 weight percent.

The preparation of the compositions is best performed using conventional dispersing and mixing equipment. In preparing this mixture the polyisocyanate is preferably dispersed in the polyols at temperatures under 40° C., more preferably at temperatures from 0° to 25° C., whereby the polyol either already contains the total amount of one or more of the deactivating agents or at least one of the deactivating agents is incorporated in the composition shortly after the dispersion operation. Of course, both types of processes can be combined, whereby the polyol, for example, can already contain part of the deactivating agent, while the other part of the deactivating agent or of a different deactivating agent is added to the composition after dispersion of the polyisocyanate.

This so-called in-situ stabilization is preferably undertaken when the deactivating agent has a significantly greater reactivity relative to the polyisocyanates than does the polyol which forms the coherent phase. Since polyol isocyanates react significantly faster with primary amines than with polyols having primary hydroxyl groups, by stirring in polyisocyanates, preferably polyisocyanates in powder form such as 1,5-naphthalene diisocyanate, 4,4'-diisocyanatodiphenylmethane, dimerized uretidione group-containing diisocyanatodiphenylmethanes, and preferably dimerized uretidione group-containing diisocyanatotoluenes into polyols containing aliphatic polyamines as the deactivating agent, preferably polyether polyols, compositions can be obtained directly which are storage-stable at room temperature. An additional advantage of this process is due to the fact that urea compounds form on the surface of the polyisocyanate particles. These urea compounds react at higher temperatures with additional polyisocyanate to form biuret group-containing polyaddition products. In other words, the deactivating agent is incorporated in the high molecular weight polyaddition product and therefore does not cause nonhomogeneous areas in the molded part.

In a different method used to prepare the compositions, the polyisocyanate is first treated with the deactivating agent in the presence of inert solvents, and the treated polyisocyanate is then dispersed into polyol. The inert solvents can be separated from the reaction mixture after deactivation of the polyisocyanate or they can be separated later from the substance mixture.

The deactivation reaction can be controlled by the addition of catalysts. Suitable deactivation catalysts are the known polyurethane catalysts used for catalysing the polyisocyanate polyol addition reaction.

In order to prepare the compositions usable as claimed in the invention, the quantitative ratios and equivalent ratios of the polyisocyanates to the polyols can be varied across wide ranges. Compositions which can be processed in unchanged form into reinforced cellular or noncellular polyurethane mold parts preferably contain the polyisocyanates and polyols in such amounts that the ratio of free isocyanate groups to hydroxyl groups is from 0.7:1 to 2.5:1, preferably from 0.9:1 to 1.2:1. However, compositions can also be prepared which contain the deactivated polyisocyanates in higher concentrations, for example in free isocyanate group-to-hydroxyl group ratios of from 2.5:1 to 100:1, preferably from 20:1 to 40:1. Such compositions, which are also characterized as master batches, are then diluted prior to processing into molded parts with the described polyols to the free isocyanate-to-hydroxyl group equivalence ratio cited above of from 0.7:1 to 2.5:1, preferably from 0.9:1 to 1.2:1.

The substance mixtures are storage stable for more than 1 month at 25° C., in other words during this time period no adverse change in the quality of the product occurs when used according to specification.

In order to prepare reinforced cellular polyurethane molded parts, blowing agents are incorporated in the composition. Water is one of the suitable blowing agents. At elevated temperatures it reacts with the free isocyanate groups to form carbon dioxide. The amounts of water which are preferably used range from 0.1 to 3 weight percent, more preferably from 0.5 to 2 weight percent based on the weight of the composition.

Other blowing agents which can be used, either alone or additionally, are low-boiling-point liquids which vaporize as a result of the heat produced in the exothermic polyaddition reaction. Suitable for this purpose are liquids which are inert relative to the organic polyisocyanate and have boiling points under 100° C. Examples of typical liquids of this type, which are preferably used, are halogenated hydrocarbons such as methylene chloride, trichlorofluoromethane, dichlorodifluoromethane, dichloromonofluoromethane, dichlorotetrafluoroethane, and 1,1,2-trichloro-2,3,3-trifluoroethane. Mixtures of these low-boiling-point liquids with one another and/or with other substituted or unsubstituted hydrocarbons can also be used.

The most desirable amount of the low boiling point liquid for use to prepare cellular polyurethane molded parts depends on the density which one wishes to achieve as well as whether or not water is also used. In general, amounts of from 1 to 15 parts by weight based on 100 parts by weight of the substance mixture produce satisfactory results. In addition, auxiliaries and/or additives can be incorporated in the compositions. Typical are, for example, catalysts, surfactants, foam stabilizers, cell regulators, fillers, colorants, pigments, flame retardants, agents to protect against hydrolysis, fungistats, and bacteriostats.

Compounds which greatly accelerate the reaction of the polyols with the isocyanates are preferably used as catalysts. Such compounds include organic metal compounds, preferably organic tin compounds such as tin II salts of organic carboxylic acids, for example tin II acetate, tin II octoate, tin II ethylhexoate, and tin II laurate, and the dialkyl tin IV salts of organic carboxylic acids, for example dibutyl tin diacetate, dibutyl tin dilaurate, dibutyl tin maleate, and dioctyl tin diacetate. The organic metal compounds are used alone or preferably, in combination with highly basic amines. Typical examples are amidines, such as 2,3-dimethyl-3,4,5,6-tetrahydropyrimidine, tertiary amines such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, pentamethyldiethylene- triamine, tetramethyldiaminoethyl ether, bis- (dimethylaminopropyl) urea, dimethylpiperazine, 1,2-dimethylimidazol, 1-azo-bicyclo-(3,3,0)octane and preferably 1,4-diaza-bicyclo(2,2,2)octane, and alkanolamine compounds such as triethanolamine, triisopropanolamine, N-methyl- and N-ethyl-diethanolamine, and dimethylethanolamine.

The following catalysts can also be used: tris (dialkylaminoalkyl)-s-hexahydrotriazine, in particular tris-N,N-dimethylaminopropyl-s-hexahydrotriazine, tetraalkylammonium hydroxides such tetramethylammonium hydroxide, alkali hydroxides such as sodium hydroxide, and alkali alcoholates such as sodium methylate and potassium isopropylate as well as alkali salts of long-chained fatty acids having from 10 to 20 carbon atoms and, optionally, hydroxyl groups on side positions. Preferably used catalyst concentrations are from 0.001 to 5 weight percent, more preferably from 0.005 to 2 weight percent catalyst or catalyst combination, based on the weight of the composition.

The surfactants which may be used are compounds which aid in homogenizing the basic materials and which may also be suitable for regulating cell structure. Typical examples are emulsifiers such as the sodium salts of castor oil sulfates or of fatty acids as well as the salts of fatty acids with amines, for example oleic acid diethylamine or stearic acid diethanolamine, salts of sulfonic acids such as alkali or ammonium salts of dodecylbenzene sulfonic acid or dinaphthylmethane disulfonic acid, and ricinoleic acid; foam stabilizers such as siloxane-oxyalkylene heteropolymers and other organopolysiloxanes, oxyethylated alkylphenols, oxyethylated fatty alcohols, paraffin oils, castor oil or castor oil acid esters and turkey red oil, and cell regulators such as paraffins, fatty alcohols and dimethylpolysiloxanes. The surfactant substances are generally used in amounts from 0.01 to 5 parts by weight based on 100 parts by weight of the composition.

Fillers are to be understood as essentially known conventional inorganic and organic fillers, weight-increasing agents, agents to improve wear in paints, coatings etc. Typical examples are: inorganic fillers such as silicate minerals, for example fibrous silicates such as antigorite, serpentine, hornblends, amphibole, chrysotile, talcum; metal oxides such as kaolin, aluminum oxides, titanium oxides, and iron oxides, metal salts such as chalk, barium sulfate, and inorganic pigments such as cadmium sulfide, zinc sulfide as well as glass, asbestos powder, etc. Kaolin (China Clay), aluminum silicate, and co-precipitates of barium sulfate and aluminum silicate as well as naturally occurring fibrous minerals such as asbestos and wollastonite are preferably used. Organic fillers which may be used are: coals, melamine, pine resin, cyclopentadienyl resins, and, preferably, graft polymers based on styrene-acrylonitrile, which are prepared through in-situ polymerization of acrylonitrile mixtures in polyether polyols similar to the disclosures made in German Pat. Nos. 11 11 394, 12 22 669 (U.S. Pat. Nos. 3,304,273; 3,383,351; 3,523,093), 11 52 536 (GB No. 1,040,452), and 11 52 537 (GB No. 987,618), as well as filler polyols whereby aqueous polymer dispersions were converted to polyol dispersions.

The inorganic and/or organic fillers, which can be used individually or as mixtures, are utilized in amounts ranging from 0.5 to 50 weight percent preferably from 1 to 40 weight percent, based on the weight of the composition.

Addtional information on other conventional auxiliaries and additives cited above can be found in the literature, for example the monograph by J. H. Sanders and K. C. Frisch, *High Polymers*, vol. XVI, *Polyurethanes*, pts. 1 and 2, Interscience Publishers, 1962/1964.

Preferred reinforcing materials are: inorganic fibers such as mineral or slag wool, fibers of asbestos, boron, aluminum oxide, carbon, steel, and, preferably, glass, organic fibers such as wool, cellulose, polyester, polyamide, polyacrylic, polyvinyl alcohol, polycarbonate, and polyurethane fibers, and/or fiber-containing planar structures consisting of needled or unneedled mats, nonwovens, felts, or woven fabrics of textile, synthetic, asbestos, carbon, metal, or, preferably, glass fibers.

The reinforcing materials can be incorporated in the composition in, for example, the following manner:

Cut fibers of varying lengths, for example from 0.05 to 1 $\mu$m, preferably from 0.1 to 0.4 $\mu$m, as well as any auxiliaries and/or additives which may be necessary, can be added to the composition with the aid of conventional metering and mixing equipment, for example stirred mixers, by means of injection mixing, etc. and can then be distributed homogeneously.

When fiber-containing planar structures are used, it is preferable to use glass fiber mats having weights per unit surface area of from 100 to 1200 $g/m^2$, preferably from 400 to 600 $g/m^2$. Here the composition, which may contain auxiliaries and/or additives, can be sprayed or poured onto the planar structure or the planar structures can be saturated individually or in several layers with the substance mixture. Since the composition does not react until higher temperatures are reached, the reinforcing materials can be treated optimally with the composition at temperatures below the reaction temperature.

The ratio of composition, which may optionally contain blowing agents, to reinforcing materials is selected in this case such that fully cured polyurethane molded parts have from 10 to 90 weight percent, preferably from 20° to 70 weight percent, of at least 1 reinforcing material, preferably glass fibers.

The preparation of reinforced cellular or noncellular polyurethane molded parts in accordance with the invention is performed in open or closed, preferably temperature-controlled metal molds, for example in steel, cast iron, or aluminum molds, at temperatures from 70° to 200° C., preferably from 100° to 180° C. Compression factors of from 1 to 10 preferably from 1.5 to 5 are used to prepare the cellular polyurethane molded parts. The residence time in the molds depends among other things on the reaction temperature as well as on the size and shape of the molded part. Generally it is from 0.25 to 12 minutes, preferably 0.5 to 5 minutes.

To prepare the polyurethane molded parts, the composition and the reinforcing materials, as well as in some cases, blowing agents, auxiliaries and/or additives are generally mixed until homogeneous at temperatures from 0° to 40° C., preferably from 10° to 30° C., the reaction mixture is fed into the open, in some cases heated mold, and is allowed to expand and cure in the open or closed mold at the cited reaction temperatures.

In another embodiment, the reinforcing materials, preferably the fiber-containing planar structures, are placed in the open mold, and the composition, which may also contain blowing agents, auxiliaries, and additives, is sprayed or poured onto the planar structure or the planar structure saturated with the composition, or treated using other methods. Then the mold is closed and the reaction mixture including the reinforcing materials treated with the composition is expanded and allowed to cure in the cited temperature of from 70° to 200° C., in some cases under compression.

If desired, the molded polyurethane parts can be coated with a release film or a decorative material at the same time that the parts are formed and cured in the molds. When boards are produced, the coating can be provided on one or two, or all sides. The inside walls of the open mold are partially or completely covered with the cited materials and then the reinforcing materials and the compositions are placed in the mold. The expansion and/or curing takes place in the manner described above.

Some examples of release films of directly or indirectly colored or printed decorative materials are: woven or nonwoven fabric of synthetic or natural fibers, metal foils, for example aluminum, copper, brass, gold, or steel sheet, polyvinylchloride, acrylonitrile-butadiene-styrene polymers, polyamide, polyester, polyethylene, polypropylene, cellulose esters or heteroesters, cardboard or roll paper, as well as unsaturated polyester resins.

The molded polyurethane parts of the invention can be used as self-supporting trim parts, reinforcing parts, or molded parts in the railroad, automotive, and aircraft manufacturing industries, for example as headliners, door and wall trim panels, instrument panels, dashboards, and engine compartment covers. However, these products are also used as trim in the furniture industry, in auto and video technology, and in the construction industry.

Because of the fact that the mold polyurethane parts claimed in the invention may have high reinforcing material contents, they may have a high modulus of elasticity, for example from 3000 to 10,000 N/mm$^2$, while simultaneously possessing good impact strength, for example values from 30 to 120 kJ/m$^2$.

EXAMPLE 1

Preparation of a Storage-stable, Heat-curable Composition 550 parts by weight of 2,4-toluene diisocyanate dimerized via uretidione bonds were dispersed at approximately 20° to 25° C. in 500 parts by weight of a polyoxypropylene glycol having a hydroxyl number of 56 using a disperser. 5.5 parts by weight of a polyamidamine (®Euretek 505 from Schering, Berlin) was dispersed into the resulting dispersion over a period of 5 minutes. A flowable, paste-like dispersion was obtained, which was storage-stable at room temperature for more than 6 months.

EXAMPLE 2

148.5 parts by weight of the heat-curable composition prepared in Example 1 and 100 parts by weight of a glycerin-initiated polyoxypropylene triol having a hydroxyl number of 400 and 0.35 parts by weight of an organometallic polyurethane catalyst (®Mergal 030 from Riedel de Haen) were mixed intensively at from 20° C. to 23° C.

Five layers of a glass fiber nonwoven mat (OCF 8681-600 CX1 from Owens Corning Fiberglass) were placed in a metal mold which had been heated to 160° C. and treated with conventional release agents, said mold having internal demensions of 150×200×3 mm, and 65.2 g of the reaction mixture was poured over these layers. The metal mold was closed with a press and the reaction mixture was cured for 3 minutes. The part was then demolded.

The physical properties obtained on the resulting molded part were:

| | | |
|---|---|---|
| Glass content | [Wt. %] | 58 |
| Tensile strength | [N/mm$^2$] | 42.6 |
| Elongation at Break | [%] | <10 |
| Shore D Hardness | | 75 |
| Dimensional Stability at elevated temperature per ISO-75 B | [°C.] | 247 |
| Modulus of flexural elasticity | [N/mm$^2$] | 7910 |
| Impact strength | | |
| −20° C. | [kJ/m$^2$] | 61.3 |
| +23° C. | [kJ/m$^2$] | 97.5 |

EXAMPLE 3

The same procedure as used in Example 2 was followed except that 7 layers of glass fiber nonwoven mat (OCF 8681-600 CX1) were used as well as 48.0 g of the heat-curable composition of Example 1.

The physical properties obtained with the resulting molded part were:

| | | |
|---|---|---|
| Glass content | [Wt. %] | 72 |
| Tensile strength | [N/mm$^2$] | 61.5 |
| Elongation at Break | [%] | <10 |
| Shore D Hardness | | 75 |
| Dimensional Stability at elevated temperature per ISO-75 B | [°C.] | 250 |
| Modulus of flexural elasticity | [N/mm$^2$] | 10410 |
| Impact strength | | |
| −20° C. | [kJ/m$^2$] | 107 |
| +23° C. | [kJ/m$^2$] | 116 |

EXAMPLE 4

210.8 parts by weight of the heat-curable composition of Example 1, 100 parts by weight of a glycerin-initiated polyoxypropylene triol having a hydroxyl number of 400, 6 parts by weight SM emulsifier additive from Bayer AG (50 weight percent aqueous solution), 0.4 parts by weight organometallic polyurethane catalyst (Mergal 030), 0.05 parts by weight dibutyl tin dilaurate, 0.05 parts by weight of a 70% solution of bis-(N,N-dimethylaminoethyl) ether in dipropylene glycol and 0.1 parts by weight foam stabilizer based on silicon (DC 190 from Dow Corning, Midland) were mixed intensively at from 20° C. to 23° C.

45 g of the reaction mixture was allowed to cure as in Example 2 in a metal mold containing 2 layers of glass fiber nonwoven mat (OCF 8681-600 CX1) to form a cellular molded part.

The molded part was demolded after 1 minute and the following physical properties were obtained:

| | | |
|---|---|---|
| Glass content | [Wt. %] | 44 |
| Density | [g/cm³] | 0.9 |
| Tensile strength | [N/mm²] | 9.7 |
| Elongation at Break | [%] | <10 |
| Modulus of flexural elasticity | [N/mm²] | 2800 |
| per ISO-75 B | [°C.] | 187 |
| Impact strength | | |
| −20° C. | [kJ/m²] | 44 |
| +23° C. | [kJ/m²] | 30 |

EXAMPLE 5

199 parts by weight of the heat-curable composition prepared in Example 1, 40 parts by weight of a glycerin-initiated polyoxypropylene-oxyethylene triol having a hydroxyl number of 35, 60 parts by weight of glycerin-initiated polyoxypropylene triol having a hydroxyl number of 560, 6 parts by weight SM emulsifier additive, 0.4 parts by weight organometallic polyurethane catalyst (Mergal 030), 0.05 parts by weight dibutyl tin dilaurate, 0.05 parts by weight of a 70 weight percent solution of bis-(N,N-dimethyl-amino-ethyl) ether in dipropylene glycol, and 0.1 parts by weight silicon-based foam stabilizer (Dow Corning DC 190) were mixed intensively at from 20° C. to 23° C.

40 g of the reaction mixture was molded as in Example 2 in a metal mold containing 2 layers of nonwoven glass fiber mat (OCF 8681-600 CX1) to form a cellular molded part. This part was demolded after 1 minute.

The following physical properties were obtained:

| | | |
|---|---|---|
| Glass content | [Wt. %] | 47 |
| Density | [g/cm³] | 0.84 |
| Tensile strength | [N/mm²] | 12.1 |
| Elongation at Break | [%] | <10 |
| Modulus of flexural elasticity | [N/mm²] | 2950 |
| Per ISO-75 B | [°C.] | 187 |
| Impact strength | | |
| −20° C. | [kJ/m²] | 35 |
| +23° C. | [kJ/m²] | 28 |

The embodiments of the invention in which an exclusive privilege or property is claimed are defined as follows:

1. A reinforced cellular or noncellular polyurethane molded article prepared by heating a reinforcing material with a room-temperature storage-stable, heat-curable mixture of polyisocyanate and polyol including necessary auxiliaries and additives wherein the polyisocyanate is present as surface-inactivated particles dispersed in the polyol, said reinforcing material employed in amounts from 20 to 70 weight percent of the fully cured polyurethane molded article.

2. The reinforced polyurethane molded article of claim 1 wherein the polyisocyanate is dispersed in the polyol in the form of discreet particles having particle diameters of from 0.1 to 150 μm, and the polyisocyanate particles are deactivated on their surface, with the further requirement that from 0.01 to 20 equivalent percent of the totally available polyisocyanate groups are deactivated and that the ratio of free isocyanate groups to hydroxyl groups is from 0.7:1 to 2.5:1.

3. The reinforced polyurethane molded article of claim 1 wherein the reagent used to deactivate the polyisocyanatae is selected from the group consisting of primary diamines, secondary amines, water, compounds containing carboxyl groups, phenolic hydroxyl groups, hydrazide groups, amide groups, or alcohol hydroxyl groups, whereby the compounds with alcohol hydroxyl groups have a water solubility of less than 1 percent by weight, or mixtures of the foregoing.

4. The reinforced polyurethane molded article of claim 1 wherein the mixture containing reinforcing materials is prepared from polyisocyanate and polyol by dispersing the polyisocyanate in the polyol at temperatures under 40° C. whereby at least one of the deactivating agents is incorporated in the resulting polyisocyanate-polyol dispersion and subsequently the reinforcing materials and necessary auxiliaries and additives are added.

5. The reinforced polyurethane molded article of claim 1 wherein the reinforcing material and heat-curable composition are charged into and cured in open or closed molds at temperatures of 70° C. to 240° C.

6. The reinforced polyurethane molded article of claim 1 wherein reinforcing materials are selected from the group consisting of inorganic fibers, organic fibers, and/or fiber-containing planar structures.

7. The reinforced polyurethane molded article of claim 1 wherein said part contains from 10 to 90 weight percent reinforcing material based on the total weight.

8. A process for the preparation of reinforced cellular or noncellular polyurethane molded parts by reacting organic polyisocyanates and polyols in the presence of reinforcing materials and necessary auxiliaries and additives with the addition of heat in open or closed molds wherein the polyisocyanates and polyols are used in the form of a mixture which is heat curable and is storage stable at room temperature, wherein the polyisocyanate is dispersed in said mixture in the form of discrete particles having particle diameters from 0.1 to 150 μm and the polyisocyanate particles are deactivated on their surfaces, and wherein from 0.01 to 20 equivalent percent of all isocyanate groups present are deactivated.

9. The process of claim 8 for the preparation of reinforced cellular or noncellular polyurethane molded articles comprising
   (a) charging a reinforcing material and a heat-curable mixture of a polyisocyanate and a polyol, storage stable at room temperature, optionally containing auxiliaries and/or additives, into a heatable mold, or
   (b) charging a reinforcing material into a heatable mold and treating with a heat-curable mixture of a polyisocyanate and a polyol, storage stable at room temperature, optionally containing necessary auxiliaries and additives,
   (c) curing said reinforcing material and heat-curable mixture (a) or (b) in an open or closed mold, optionally under compression, at temperatures from 70° to 200° C.

* * * * *